May 13, 1930.                O. J. GROEHN                1,758,396
                            AUTOMOBILE BODY
                            Filed June 26, 1928
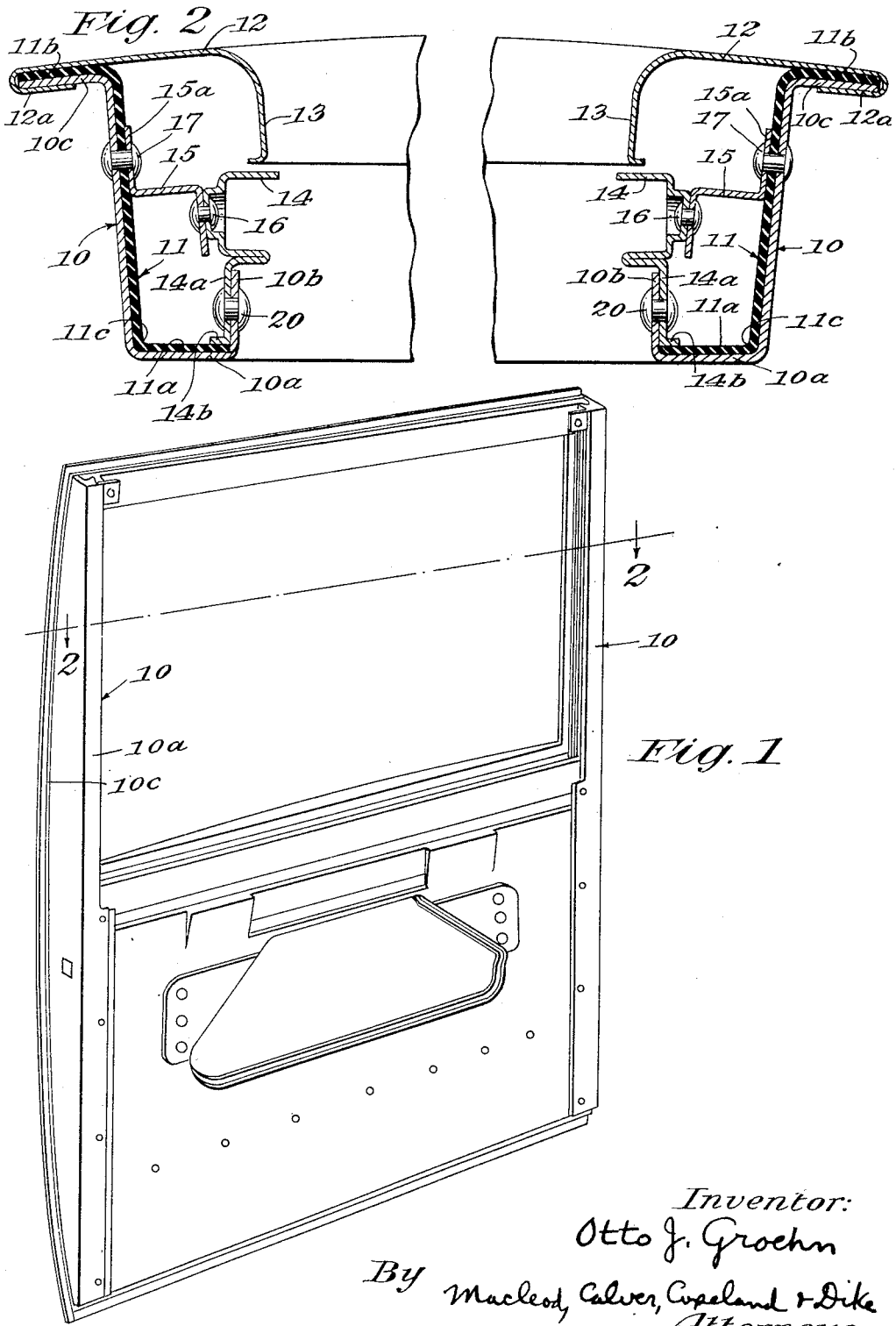
Inventor:
Otto J. Groehn
By Macleod, Calver, Copeland + Dike
Attorneys.

Patented May 13, 1930

1,758,396

UNITED STATES PATENT OFFICE

OTTO J. GROEHN, OF GROSSE POINTE PARK, MICHIGAN, ASSIGNOR TO HUDSON MOTOR CAR COMPANY, OF DETROIT, MICHIGAN, A CORPORATION OF MICHIGAN

AUTOMOBILE BODY

Application filed June 26, 1928. Serial No. 288,424.

This invention relates to automobile bodies, particularly of the type where substantially all-metal construction is employed, an object of the invention being to improve the construction of the bodies whereby metallic resonances and vibrational noises of the pillars and adjacent panelling, especially in the case of doors, will be deadened or damped.

In the use of all-metal bodies, certain objections have been found due to resonances of the metal pillars and panelling. These objectionable noises are especially noticeable in the case of the doors which give out an undesirable metallic ring when closed, or frequently produce metallic noises due to vibrations when the vehicle is being operated.

One of the objects of this invention is to provide a practicable and efficient means for silencing and deadening the noise in the doors of automobile bodies, when closed, while at the same time providing a relatively simple and inexpensive construction which may be readily and easily employed with a minimum of expense, this being especially advantageous where automobile bodies are produced on a large scale.

Other objects of this invention will appear in the following description and appended claims, reference being had to the accompanying drawings forming a part of this specification wherein like reference characters designate corresponding parts in the several views.

In the drawings:

Fig. 1 is a perspective view illustrating a metal door for an automobile body embodying the invention.

Fig. 2 is a sectional view taken substantially on line 2—2, Fig. 1, looking in the direction of the arrows.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and that it is not intended to limit the invention beyond the terms of the several claims hereto appended as considered in view of the prior art and the requirements thereof.

In the drawings I have illustrated the invention as embodied in a door for a metal automobile body of the closed type. This door may comprise a pair of upright metal door pillars 10 connected at their tops and bottoms by suitable cross members and each of which is stamped to provide an inwardly extending rear side flange $10^a$ and also to provide an outwardly extending front side flange $10^c$, the flanges $10^a$ and $10^c$ of the respective pillars extending in opposite directions as shown. The edges of the flanges $10^a$ are extended forwardly or transversely of the door at $10^b$ to provide a flanged opening within which the window guides are supported. Mounted upon the inner face of the door pillar 10 is a relatively stiff sheet of soundproofing material 11, such as heavy cardboard or fibre board. This sheet forms a non-metallic backing layer for the pillar 10 and is in engagement with the pillar throughout its length. The sheet 11 is bent to overlie the flange $10^c$ at $11^b$ and preferably covers this flange throughout the length thereof. The sheet also is bent and creased at $11^c$ to provide a portion $11^a$ extending over the inner face of the flange $10^a$.

The door is provided with an outer panel 12 which is stamped and shaped from a sheet metal blank, such as sheet steel, and is formed with a window opening 13. The sheet metal panel 12 is bent or crimped around the contiguous edges of the flange portions $10^c$ and $11^b$ of the pillar and backing sheet respectively so that the panel 12 extends around the edges of these flange portions as shown at $12^a$.

The outer panel 12 is stamped out from the metal blank to provide a permanent outward curvature giving the outer side of the door a configuration to conform to the curved lines of the body. When the side edges of this panel are crimped or bent around the edges of the flange portions $10^c$ and $11^b$, the opposite side portions of the panel are pressed firmly against the portions 11ᵇ of the sheet 11 and are held thereagainst under considerable tension. As a result the sheet 11 where it overlies the side flanges 10ᶜ of the door pillars will be held between the pillar and the panel 12 under substantial pressure so that as a result the interposed non-metallic material will effectually damp or deaden any metallic vibrational noises commonly resulting in the use of metallic doors of this type.

The door is also provided with the usual window guides 14. Each guide is secured at 16, as by riveting, to a metal angle bracket 15 one flange of the latter being riveted at 17 to the door pillar 10. The soundproofing sheet 11 is interposed between the flange 15ᵃ of the bracket 15 and the inside face of the pillar 10 and is clamped in position between these parts. The window guide 14 is provided with an extension 14ᵃ overlying the door pillar flange 10ᵇ and these parts are riveted together at 20 in such manner that the inner free edge of the extension 14ᵃ, which may be turned out to provide a flange 14ᵇ, will engage the marginal edge of the sheet 11ᵃ and clamp it in position.

From the foregoing it will be seen that I have provided a relatively simple and efficient means whereby metallic resonances in the metal doors may be reduced and deadened. The soundproofing sheet 11 is bent or formed into Z shape so as to conform to the corresponding contour of the inner face of the door pillar 10. This sheet is clamped at a point adjacent one edge between a flange of the door pillar and the outer panel, at the opposite edge between a flange of the pillar and an extension of the window guide structure, and at an intermediate point between the pillar and a supporting bracket for the window guide proper. In this manner the sheet 11 is firmly held in position, so that when the door is slammed in closing it, or when the car is being driven over rough ground, objectionable metallic noises will be prevented.

What I claim is:

1. In a door for an automobile body, a pair of upright metal pillars having at the front thereof oppositely extending flanges, a sheet metal panel extending over said flanges, a non-metallic soundproofing sheet covering the inner surface of each pillar and bent to extend over each flange, the edges of said panel being bent around the edges of said flanges and said sheet, said sheet being interposed between said panel and flanges.

2. In a door for an automobile body, an upright metal pillar having an outwardly extending side flange, a non-metallic soundproofing sheet located on the inner face of said pillar and extending over said flange, and a sheet metal panel having a side edge bent around the edges of said sheet and flange and held under tension against said sheet, said sheet being interposed between said panel and flange.

3. In a door for an automobile body, a pair of upright metal pillars having outwardly extending side flanges, a non-metallic soundproofing sheet shaped to conform to the shape of the inner face of each pillar and covering said flange, and a sheet metal panel having a side edge bent around the edges of said sheet and flange, said sheet being interposed and held under pressure between said panel and flange.

4. In a door for an automobile body, an upright metal pillar shaped to provide an outwardly extending side flange, a window guide structure secured to said pillar, and a non-metallic soundproofing sheet located on the inner face of said pillar and clamped in position between said pillar and said window guide structure.

5. In a door for an automobile body, a pair of spaced upright metal pillars, each formed into substantially Z-shape to provide a central web terminating in oppositely extending outer and inner flanges, a soundproofing sheet positioned on the inner face of each pillar, a sheet metal panel joining said pillars and clamping the sheet against said outer flanges, and window guides having means for clamping the sheet against the central webs of the pillars and against said inner flanges.

6. In a door for an automobile body, a unitary upright metal pillar, a sheet metal panel having its edge secured to said pillar, and a non-metallic soundproofing sheet within said pillar and having a portion interposed between said pillar and panel.

In testimony whereof I affix my signature.

OTTO J. GROEHN.